United States Patent
Zhong (10) Patent No.: US 12,416,425 B2
(45) Date of Patent: Sep. 16, 2025

(54) CONTROL METHOD AND DEVICE FOR AIR CONDITIONER OUTDOOR UNIT, AIR CONDITIONER OUTDOOR UNIT, AND AIR CONDITIONER

(71) Applicant: GD MIDEA AIR-CONDITIONING EQUIPMENT CO., LTD., Guangdong (CN)

(72) Inventor: Wenchao Zhong, Guangdong (CN)

(73) Assignee: GD MIDEA AIR-CONDITIONING EQUIPMENT CO., LTD., Guangdong (CN)

( * ) Notice: Subject to any disclaimer, the term of this patent is extended or adjusted under 35 U.S.C. 154(b) by 364 days.

(21) Appl. No.: 17/970,188

(22) Filed: Oct. 20, 2022

(65) Prior Publication Data

US 2023/0040126 A1 Feb. 9, 2023

Related U.S. Application Data

(63) Continuation of application No. PCT/CN2020/142240, filed on Dec. 31, 2020.

(30) Foreign Application Priority Data

May 29, 2020 (CN) .......................... 202010479478.2

(51) Int. Cl.
*F24F 11/64* (2018.01)

(52) U.S. Cl.
CPC .................................. *F24F 11/64* (2018.01)

(58) Field of Classification Search
CPC ............ F25B 49/022; F25B 2700/1931; F25B 2700/1933; F24F 11/86; F24F 2140/12
See application file for complete search history.

(56) References Cited

U.S. PATENT DOCUMENTS 5,150,581 A * 9/1992 Smith ................ G05D 16/2066
62/DIG. 17
2012/0131935 A1* 5/2012 Kim ........................ F24F 11/30
62/126

(Continued)

FOREIGN PATENT DOCUMENTS

CN 1936461 A 3/2007
CN 103292421 A 9/2013

(Continued)

OTHER PUBLICATIONS

Written Opinion dated Mar. 26, 2021 issued in PCT/CN2020/142240.

(Continued)

*Primary Examiner* — Lionel Nouketcha
(74) *Attorney, Agent, or Firm* — Scully, Scott, Murphy & Presser, P.C.

(57) ABSTRACT

A control method and device for an air conditioner outdoor unit, an outdoor unit and an air conditioner are provided. The outdoor unit has a compressor, a first sensor for detecting an air exhaust pressure of the compressor, and a second sensor for detecting an air return pressure of the compressor. According to the method, a target pressure value is determined; an air exhaust pressure value detected by the first sensor or an air return pressure value detected by the second sensor is periodically obtained as a first pressure value; and the frequency of the compressor is adjusted according to the first pressure value and the target pressure value.

19 Claims, 7 Drawing Sheets

(56) References Cited

U.S. PATENT DOCUMENTS

2019/0383516 A1* 12/2019 Baba ...................... F24F 11/61
2020/0158362 A1*  5/2020 Ma ........................ F24F 11/85

FOREIGN PATENT DOCUMENTS

| | | | |
|---|---|---|---|
| CN | 104089328 | A | 10/2014 |
| CN | 103292422 | B | 12/2015 |
| CN | 106016457 | A | 10/2016 |
| CN | 108195050 | A | 6/2018 |
| CN | 108844129 | A | 11/2018 |
| CN | 107120786 | B | 11/2019 |
| CN | 111023501 | A | 4/2020 |
| CN | 111578460 | A | 8/2020 |
| CN | 111578472 | A | 8/2020 |
| JP | 2001280669 | A | 10/2001 |
| JP | 2003042582 | A | 2/2003 |
| JP | 2012202590 | A | 10/2012 |

OTHER PUBLICATIONS

International Search Report dated Mar. 26, 2021 issued in PCT/CN2020/142240.
First Office Action dated Feb. 3, 2021 received in Chinese Patent Application No. CN 202010479478.2.
Second Office Action dated Sep. 27, 2021 received in Chinese Patent Application No. CN 202010479478.2.

* cited by examiner

CONTROL METHOD AND DEVICE FOR AIR CONDITIONER OUTDOOR UNIT, AIR CONDITIONER OUTDOOR UNIT, AND AIR CONDITIONER

CROSS-REFERENCE TO RELATED APPLICATIONS

The present application is a continuation application of PCT International Application No. PCT/CN2020/142240, filed on Dec. 31, 2020, which claims priority to and benefits of Chinese Application No. 202010479478.2, filed on May 29, 2020 and entitled "CONTROL METHOD AND DEVICE FOR AIR CONDITIONER OUTDOOR UNIT, AIR CONDITIONER OUTDOOR UNIT, AND AIR CONDITIONER," the entire contents of which are incorporated herein by reference for all purposes. No new matter has been introduced.

FIELD

The present disclosure relates to the field of air conditioner technologies, and in particular, to a control method and device for an air conditioner outdoor unit, an air conditioner outdoor unit and an air conditioner.

BACKGROUND

At present, existing air-conditioning systems require indoor and outdoor units mounted in a specific match for use, and are operated under control of the communication between the indoor and outdoor units through the intercommunication of indoor and outdoor parameters. The operation of the outdoor unit depends on a control signal sent from the indoor unit. When there is no communication between the indoor and outdoor units, the air-conditioning systems cannot be started to operate.

SUMMARY

The present disclosure aims to solve at least one of the technical problems in related arts to some extent. Therefore, the present disclosure provides a control method for an air conditioner outdoor unit, an air conditioner outdoor unit and an air conditioner to solve one or more technical problems in the prior art, and at least provides a beneficial selection or creative condition.

In a first aspect, an embodiment of the present disclosure provides a control method for an air conditioner outdoor unit, where the outdoor unit includes a compressor, a first sensor arranged to detect an air exhaust pressure of the compressor, and a second sensor arranged to detect an air return pressure of the compressor, and the method includes:
  determining a target pressure value;
  periodically obtaining an air exhaust pressure value detected by the first sensor or an air return pressure value detected by the second sensor as a first pressure value; and
  adjusting a frequency of the compressor according to the first pressure value and the target pressure value.

The control method for the air conditioner outdoor unit in the embodiment of the present disclosure has at least the following beneficial effects: the air exhaust pressure value or the air suction pressure value of the compressor is obtained as the first pressure value, the frequency of the compressor is adjusted according to the first pressure value and the target pressure value, and thus it is not necessary to obtain a signal from an indoor unit. The method may be applied to a situation where there is no communication between the indoor unit and the outdoor unit. The air-conditioning system can operate even if there is no communication between the indoor unit and the outdoor unit, and the indoor unit and the outdoor unit may be matched at will.

In some embodiments, when the outdoor unit is in a refrigerating mode, the air return pressure value of the second sensor is periodically obtained as the first pressure value, and when the outdoor unit is in a heating mode, the air exhaust pressure value detected by the first sensor is periodically obtained as the first pressure value. The corresponding pressure value can be selected to adjust the frequency of the compressor according to different modes, and an adjustment result would be more accurate.

In some embodiments, the determining the target pressure value includes:
  obtaining a first outdoor temperature value;
  obtaining the air exhaust pressure value detected by the first sensor;
  obtaining the air return pressure value detected by the second sensor; and
  determining the target pressure value according to the first outdoor temperature value, the air exhaust pressure value and the air return pressure value.

The target pressure value is determined first, and the outdoor unit can adjust the frequency of the compressor according to the target pressure value.

In some embodiments, the determining the target pressure value according to the first outdoor temperature value, the air exhaust pressure value and the air return pressure value includes:
  determining the target pressure value from a preset correspondence table according to the first outdoor temperature value, the air exhaust pressure value and the air return pressure value.

An initial target pressure value is directly obtained through the preset correspondence table, and the target pressure value is quickly determined, and system resources are saved.

In some embodiments, the determining the target pressure value, and the periodically obtaining the air exhaust pressure value detected by the first sensor or the air return pressure value detected by the second sensor as the first pressure value, include:
  determining the target pressure value;
  adjusting operating parameters of the outdoor unit according to the target pressure value; and
  periodically obtaining the air exhaust pressure value detected by the first sensor or the air return pressure value detected by the second sensor as the first pressure value.

The operating parameters of the outdoor unit are adjusted according to the target pressure value, and once the outdoor unit operates according to the operating parameters of the target pressure value, the first pressure value is then obtained for adjustment, and the frequency of the compressor may be adjusted more accurately.

In some embodiments, the determining the target pressure value, and the periodically obtaining the air exhaust pressure value detected by the first sensor or the air return pressure value detected by the second sensor as the first pressure value, include:
  determining the target pressure value;
  adjusting operating parameters of the outdoor unit according to the target pressure value;

operating the outdoor unit for a first preset time according to the operating parameters; and periodically obtaining the air exhaust pressure value detected by the first sensor or the air return pressure value detected by the second sensor as the first pressure value.

The outdoor unit operates for the first preset time according to the operating parameters, and then the first pressure value is obtained for adjustment once an operation state of the outdoor unit becomes stable, and the frequency of the compressor may be adjusted more accurately.

In some embodiments, the outdoor unit further includes a fan and an electronic expansion valve, and the adjusting the operating parameters of the outdoor unit according to the target pressure value includes:

determining a revolving speed value of the fan, a step number of the electronic expansion valve and a frequency value of the compressor according to the target pressure value; and adjusting a revolving speed of the fan to the revolving speed value of the fan, adjusting an opening degree of the electronic expansion valve to the step number of the electronic expansion valve, and adjusting the frequency of the compressor to the frequency value of the compressor.

By jointly adjusting the fan, the opening degree of the electronic expansion valve and the frequency of the compressor, the outdoor unit quickly reaches a state corresponding to the target pressure value.

In some embodiments, the adjusting the frequency of the compressor according to the first pressure value and the target pressure value includes:

determining a corresponding first temperature value according to the first pressure value;

determining a corresponding target temperature value according to the target pressure value;

calculating a first temperature difference between the first temperature value and the target temperature value; and adjusting the frequency of the compressor according to a current frequency of the compressor and the first temperature difference.

The temperature value corresponding to the pressure value is determined according to a corresponding relationship between temperature and pressure, and the frequency of the compressor is adjusted according to the temperature difference, and the adjustment may be more accurate.

In some embodiments, the adjusting the frequency of the compressor according to the current frequency of the compressor and the first temperature difference includes:

determining a corresponding frequency difference according to the first temperature difference;

determining a new frequency according to the current frequency and the frequency difference; and adjusting the frequency of the compressor to the new frequency.

The frequency difference to be adjusted is determined according to the first temperature difference, and the new frequency of the compressor is determined and the adjustment may be more accurate.

In some embodiments, the new frequency is determined by the following formula:

$$F=F0+\Delta F+C;$$

where F is the new frequency, F0 is the current frequency, $\Delta F$ is the frequency difference, and C is a preset frequency value.

Considering the differences in different air conditioners, setting the preset frequency value may make the adjustment more accurate.

In some embodiments, the determining the corresponding frequency difference according to the first temperature difference is implemented by the following formula:

$$\Delta F = K \times \Delta T;$$

where $\Delta T$ is the first temperature difference, K represents a linear relationship between the first temperature difference and the frequency difference, and K is a preset value.

In some embodiments, the method further includes: obtaining the air exhaust pressure value detected by the first sensor or the air return pressure value detected by the second sensor as a second pressure value once the outdoor unit operates for a second preset time, and determining a new target pressure value according to the second pressure value and the first pressure value, where the second pressure value and the first pressure value are detected by the same sensor. By correcting the target pressure value, the operation of the outdoor unit is more stable.

In some embodiments, the determining the new target pressure value according to the second pressure value and the first pressure value includes:

determining a corresponding first temperature value according to the first pressure value;

determining a corresponding second temperature value according to the second pressure value;

determining a corresponding target temperature value according to the target pressure value;

calculating a second temperature difference between the first temperature value and the second temperature value;

determining a new target temperature value according to the second temperature difference and the target temperature value; and determining the new target pressure value according to the new target temperature value.

By converting the pressure value into the temperature value, the new target temperature value is obtained according to the temperature difference and then converted into the new target pressure value, and the adjustment is related to the change of temperature, and the adjustment may be more accurate.

In some embodiments, the determining the new target temperature value according to the second temperature difference and the target temperature value includes:

when the second temperature difference is no greater than a first threshold, determining the new target temperature value being equal to the target temperature value plus a preset variable;

when the second temperature difference is greater than the first threshold and no greater than a second threshold, determining the new target temperature value being equal to the target temperature value; and when the second temperature difference is greater than the second threshold, determining the new target temperature value being equal to the target temperature value minus the preset variable;

where the second threshold is greater than the first threshold.

The target temperature value is increased or decreased according to the change of temperature, and the operation of the outdoor unit may be more stable.

In some embodiments, the method further includes: when the outdoor unit is shut down and re-started, determining that a time interval between two times of start-up is no greater than a third preset time, and when a third temperature difference between a current outdoor temperature value and the first outdoor temperature value is no greater than a preset temperature, determining the target pressure value as the first pressure value obtained by the time of the outdoor unit being shut down, once the outdoor unit is re-started.

When the outdoor unit is shut down and re-started, the recorded first pressure value when the outdoor unit is shut down is directly read as the target pressure value as long as preset conditions are satisfied, and system resources are saved.

In some embodiments, the determining the target pressure value includes the following steps:

receiving a start-up signal sent by a signal box to control the outdoor unit to start; and determining the target pressure value.

The outdoor unit is controlled to start directly through the signal box, and thus there is no need to communicate with the indoor unit.

In a second aspect, an embodiment of the present disclosure further provides a control device for an air conditioner outdoor unit, where the outdoor unit includes a compressor, a first sensor arranged to detect an air exhaust pressure of the compressor, and a second sensor arranged to detect an air return pressure of the compressor; and the control device includes:

a determination module configured for determining a target pressure value;

an acquisition module configured for periodically obtaining an air exhaust pressure value detected by the first sensor or an air return pressure value detected by the second sensor as a first pressure value; and a control module configured for adjusting a frequency of the compressor according to the first pressure value and the target pressure value.

The control device for the air conditioner outdoor unit in the embodiment of the present disclosure has at least the following beneficial effects: the air exhaust pressure value or the air suction pressure value of the compressor is obtained as the first pressure value, the frequency of the compressor is adjusted according to the first pressure value and the target pressure value, and thus it is not necessary to obtain a signal from an indoor unit. The device may be applied to a situation where there is no communication between the indoor unit and the outdoor unit. The air-conditioning system can operate even if there is no communication between the indoor unit and the outdoor unit, and the indoor unit and the outdoor unit may be matched at will.

In a third aspect, an embodiment of the present disclosure provides an air conditioner outdoor unit, where the outdoor unit includes a compressor, a first sensor arranged to detect an air exhaust pressure of the compressor, and a second sensor arranged to detect an air return pressure of the compressor, and the outdoor unit further includes the control device according to the second aspect.

The air conditioner outdoor unit in the embodiment of the present disclosure has at least the following beneficial effects: the air exhaust pressure value or the air suction pressure value of the compressor is obtained as the first pressure value, the frequency of the compressor is adjusted according to the first pressure value and the target pressure value, and thus it is not necessary to obtain a signal from an indoor unit. The outdoor unit may be applied to a situation where there is no communication between the indoor unit and the outdoor unit. The air-conditioning system can operate even if there is no communication between the indoor unit and the outdoor unit, and the indoor unit and the outdoor unit may be matched at will.

In a fourth aspect, an embodiment of the present disclosure further provides an air conditioner outdoor unit, including a memory, a processor, and a computer program stored on the memory and executable by the processor, where the processor implements the control method according to the first aspect when executing the computer program.

The air conditioner outdoor unit in the embodiment of the present disclosure has at least the following beneficial effects: the air exhaust pressure value or the air suction pressure value of the compressor is obtained as the first pressure value, the frequency of the compressor is adjusted according to the first pressure value and the target pressure value, and thus it is not necessary to obtain a signal from an indoor unit. The outdoor unit may be applied to a situation where there is no communication between the indoor unit and the outdoor unit. The air-conditioning system can operate even if there is no communication between the indoor unit and the outdoor unit, and the indoor unit and the outdoor unit may be matched at will.

In a fifth aspect, an embodiment of the present disclosure further provides an air conditioner, where the air conditioner includes an indoor unit and an outdoor unit according to the third aspect or the fourth aspect.

The air conditioner in the embodiment of the present disclosure has at least the following beneficial effects: the outdoor unit obtains the air exhaust pressure value or the air suction pressure value of the compressor as the first pressure value, the frequency of the compressor is adjusted according to the first pressure value and the target pressure value, and thus it is not necessary to obtain a signal from an indoor unit. The air conditioner may be applied to a situation where there is no communication between the indoor unit and the outdoor unit. The air-conditioning system can operate even if there is no communication between the indoor unit and the outdoor unit, and the indoor unit and the outdoor unit may be matched at will.

In a sixth aspect, an embodiment of the present disclosure further provides a non-transitory computer-readable storage medium stored with a computer-executable instruction, where the computer-executable instruction is used by a computer to execute the control method according to the first aspect.

BRIEF DESCRIPTION AF DRAWINGS

The accompanying drawings are provided to further understand the solutions of the present disclosure and constitute a part of the specification, and the accompanying drawings are used together with the embodiments of the present disclosure to explain the solutions of the present disclosure, but do not constitute a limitation to the solutions of the present disclosure.

DETAILED DESCRIPTION AF EMBODIMENTS

To make the objects, the solutions, and the advantages of the present disclosure clearer, the present disclosure is further described in detail hereinafter with reference to the accompanying drawings and the embodiments. It should be understood that the specific embodiments described herein are only used for explaining the present disclosure, and are not intended to limit the present disclosure.

It should be noted that although the functional module division is performed in the schematic diagram of the system and the logical sequence is shown in the flow chart, the steps shown or described may be executed by the module division different from that in the system or the sequence different from that in the flow chart in some cases. The terms "first", "second", etc. in the specification, the claims, and the accompanying drawings above are used to distinguish similar objects, and are not necessarily used to describe a specific order or sequence.

The embodiments of the present disclosure are further described hereinafter with reference to the accompanying drawings.

Figure 1:
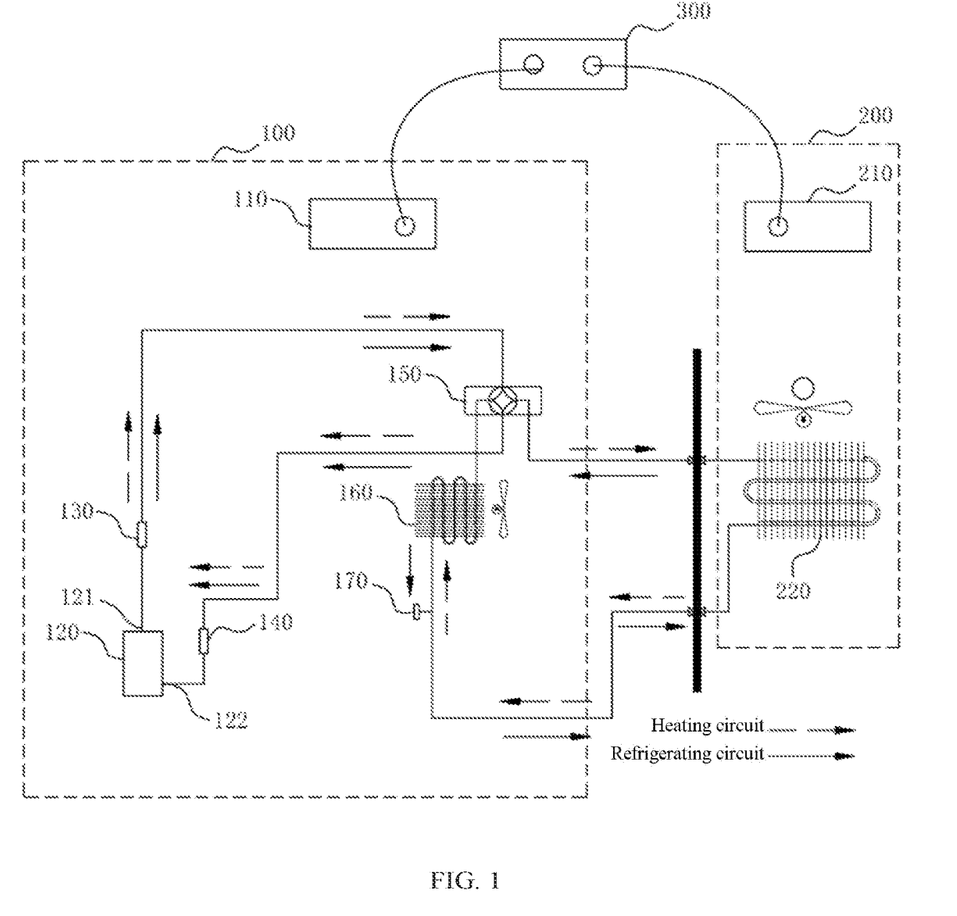
FIG. 1 is a schematic architectural diagram of an air conditioner according to an embodiment of the present disclosure.

As shown in FIG. 1, FIG. 1 is a schematic architectural diagram of an air conditioner according to an embodiment of the present disclosure. As shown in FIG. 1, an air-conditioning system includes an outdoor unit 100, an indoor unit 200 and an external on-off signal box 300. The outdoor unit includes a memory (not shown in the drawings), a first controller 110, a compressor 120, a first sensor 130, a second sensor 140, a four-way valve 150, an outdoor heat exchanger 160 and an electronic expansion valve 170. The indoor unit includes a second controller 210 and an indoor heat exchanger 220. And the external on-off signal box 300 is connected with the first controller 110 and the second controller 210, respectively.

The compressor 120 includes an air exhaust port 121 and an air return port 122. The first sensor 130 may be arranged on the air exhaust port 121 or between the air exhaust port 121 and the outdoor heat exchanger 160, and configured to detect an air exhaust pressure value of the compressor 120, which means that a high pressure of a refrigerant is detected. The second sensor 140 may be arranged on the air return port 122 or between the air return port 122 and the indoor heat exchanger 220, and configured to detect an air return pressure value of the compressor 120, which means that a low pressure of the refrigerant is detected.

In an example shown in FIG. 1, in a refrigerating mode, a coolant flows out of the compressor 120, and passes through the four-way valve 150, the outdoor heat exchanger 160, the electronic expansion valve 170, the indoor heat exchanger 220 and the four-way valve 150 in sequence and flows back into the compressor 120, so as to form a refrigerating circuit of the coolant. At the moment, the outdoor heat exchanger 160 is used as a condenser and the indoor heat exchanger 220 is used as an evaporator. In a heating mode, the coolant flows out of the compressor 120, and passes through the four-way valve 150, the indoor heat exchanger 220, the electronic expansion valve 170, the outdoor heat exchanger 160 and the four-way valve 150 in sequence and flows back into the compressor 120, so as to form a heating circuit of the coolant. At the moment, the indoor heat exchanger 220 is used as a condenser and the outdoor heat exchanger 160 is used as an evaporator.

The memory, the compressor 120, the first sensor 130, the second sensor 140, the four-way valve 150 and the electronic expansion valve 170 are electrically connected with the first controller respectively, where the memory and the controller may be connected by a bus or in other arrangements. The indoor heat exchanger 220 is electrically connected with the second controller 210.

The memory is used as a non-transitory computer-readable storage medium, and may be used for storing a non-transitory software program and a non-transitory computer-executable program. In addition, the memory may include a high-speed random access memory, and may further include a non-transitory memory, such as at least one disk memory device, flash memory device, or other non-transitory solid-state memory devices. In some embodiments, the memory may include a memory remotely arranged relative to the controller, and these remote memories may be connected to the system architecture platform through a network. Examples of the above network include but are not limited to the Internet, the Intranet, the local area network, the mobile communication network and a combination thereof.

Those skilled in the art may understand that the air conditioner shown in FIG. 1 does not constitute a limitation to the embodiments of the present disclosure, and may include more or less components than those shown in the drawing, or some components may be combined or provided in a different arrangement.

In the schematic architectural diagram of the air conditioner shown in FIG. 1, the first controller 110 may run a control program stored in the memory and execute a control method of the outdoor unit 100.

Based on the schematic architectural diagram of the air conditioner above, various embodiments of a control method of the present disclosure are provided below.

Figure 2:
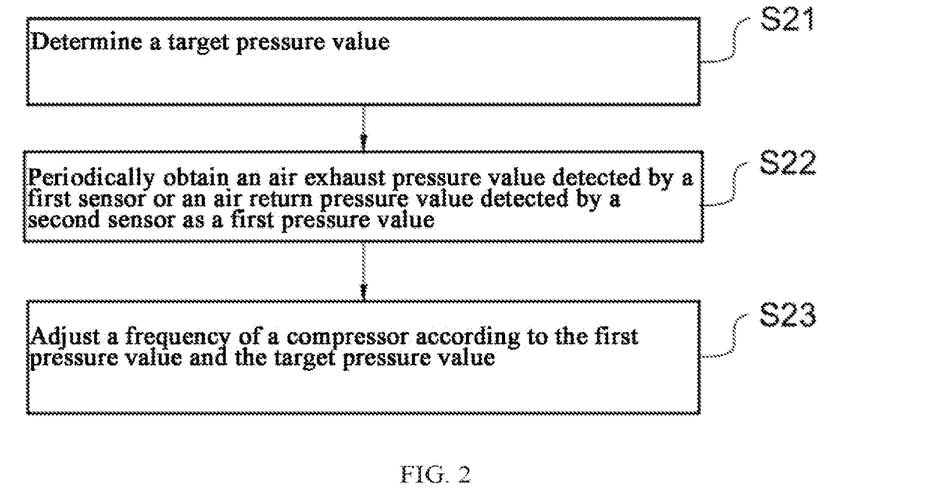
FIG. 2 is a flow chart of a control method for an air conditioner outdoor unit according to an embodiment of the present disclosure.

As shown in FIG. 2, FIG. 2 is a flow chart of a control method for an air conditioner outdoor unit according to an embodiment of the present disclosure. The air conditioner outdoor unit includes a compressor, a first sensor configured to detect an air exhaust pressure of the compressor, and a second sensor configured to detect an air return pressure of the compressor. The control method includes but is not limited to step S21, step S22 and step S23.

In S21, a target pressure value is determined.

The outdoor unit operates according to preset initial operating parameters after being started. The outdoor unit further includes a fan and an electronic expansion valve, and the initial operating parameters include a preset revolving speed value of the fan, a preset step number of the electronic expansion valve and a preset frequency value of the compressor. The outdoor unit operates according to the preset revolving speed value of the fan, the preset step number of the electronic expansion valve and the preset frequency value of the compressor after being started. The target pressure value of the outdoor unit is determined first to control the outdoor unit to operate according to the operating parameters corresponding to the target pressure value. In an embodiment, the target pressure value may be determined in different embodiments, and appropriate selection may be made according to an actual application situation. In an embodiment, the target pressure value may be determined according to an outdoor temperature value, or selected in a pressure value range corresponding to a preset temperature range.

Figure 3:
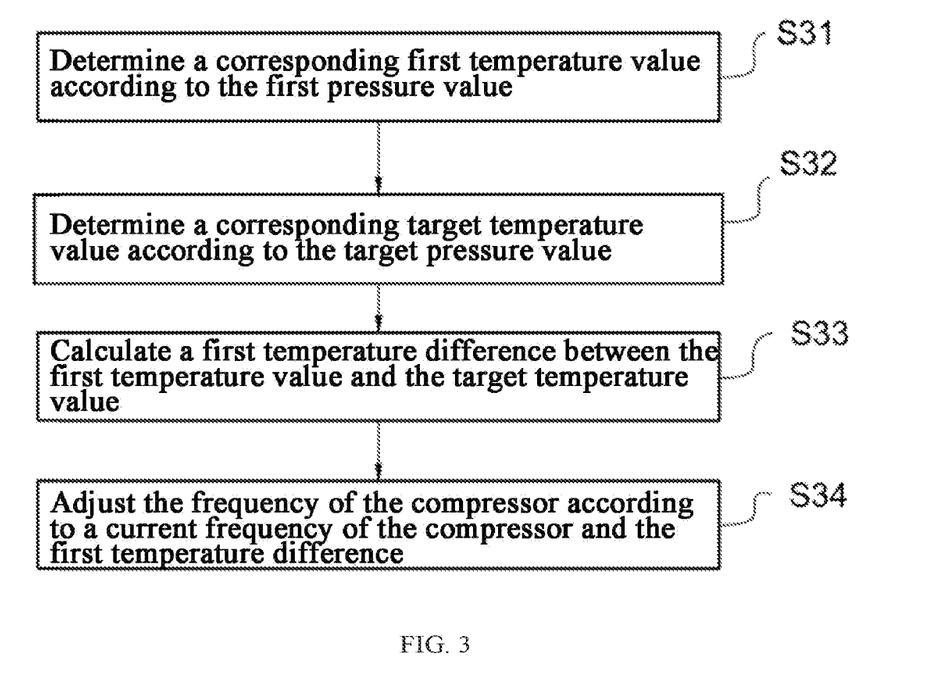
FIG. 3 is a flow chart of a control method for an air conditioner outdoor unit according to another embodiment of the present disclosure.

In an embodiment, the step S21 includes the following steps:
obtaining a first outdoor temperature value;
obtaining an air exhaust pressure value detected by the first sensor;
obtaining an air return pressure value detected by the second sensor; and
determining the target pressure value according to the first outdoor temperature value, the air exhaust pressure value and the air return pressure value.

In some embodiments, the outdoor unit is provided with a temperature detection device configured to detect the outdoor temperature, and the temperature detection device may be a temperature sensor, such as a thermocouple or a thermistor or other devices capable of measuring temperature. The first sensor is arranged on an air exhaust port, and configured to detect the air exhaust pressure value of the compressor, which means that a high pressure of a refrigerant is detected. The second sensor is arranged on an air return port, and configured to detect the air return pressure value of the compressor, which means that a low pressure of the refrigerant is detected.

The target pressure value is determined from a preset correspondence table according to the first outdoor temperature value, the air exhaust pressure value and the air return pressure value. In an embodiment, in a refrigerating mode, the target pressure value is selected from a pressure value range corresponding to 7° C. to 20° C.; and in a heating mode, the target pressure value is selected from a pressure value range corresponding to 45° C. to 58° C.

In S22, the air exhaust pressure value detected by the first sensor or the air return pressure value detected by the second sensor is periodically obtained as a first pressure value.

When the outdoor unit is in the refrigerating mode, the air return pressure value of the second sensor is periodically obtained as the first pressure value, and when the outdoor unit is in the heating mode, the air exhaust pressure value detected by the first sensor is periodically obtained as the first pressure value.

In an embodiment, a period of obtaining is set according to an actual situation, and the period of obtaining may be 60 seconds. After periodically obtaining the first pressure value, it is convenient for adjusting a frequency of the compressor by using the first pressure value in subsequent steps.

In S23, the frequency of the compressor is adjusted according to the first pressure value and the target pressure value.

The frequency of the compressor is adjusted according to the first pressure value and the target pressure value to make the first pressure value equal to the target pressure value.

Figure 4:
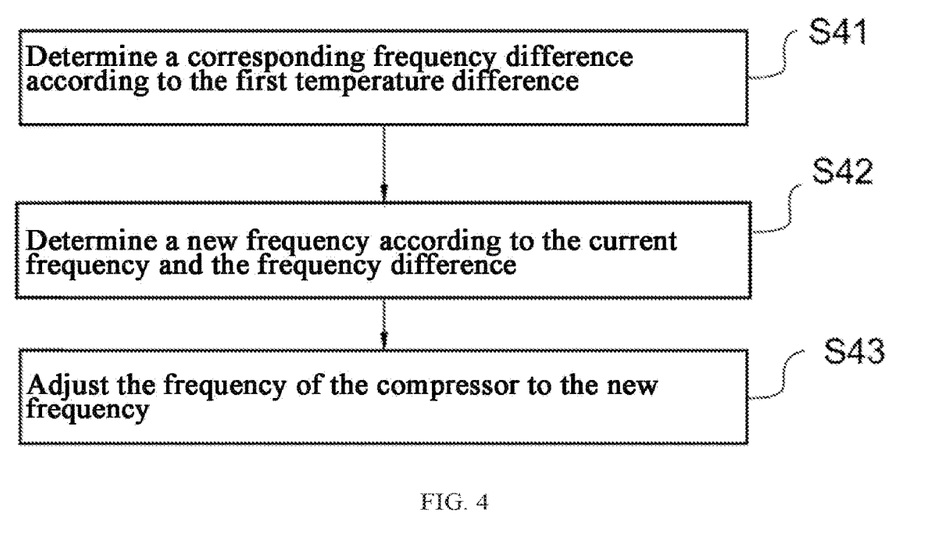
FIG. 4 is a flow chart of a control method for an air conditioner outdoor unit according to another embodiment of the present disclosure.

In an embodiment, the step S23 includes the following steps:
S31: determining a corresponding first temperature value according to the first pressure value;
S32: determining a corresponding target temperature value according to the target pressure value;
S33: calculating a first temperature difference between the first temperature value and the target temperature value; and
S34: adjusting the frequency of the compressor according to a current frequency of the compressor and the first temperature difference.

In some embodiments, the same refrigerant has different saturation temperatures under different pressures, while different refrigerants also have different saturation temperatures under the same pressure. According to a comparison table of temperature and pressure of the refrigerant, a corresponding relationship between the temperature and the pressure of the refrigerant may be determined.

In the refrigerating mode, the first pressure value is the air exhaust pressure value, which is converted into a condensation temperature according to the comparison table of temperature and pressure of the refrigerant, which means that the first temperature value is determined according to the first pressure value by referring to the table of temperature and pressure of the refrigerant.

In the heating mode, the first pressure value is the air return pressure value, which is converted into an evaporation temperature according to the comparison table of temperature and pressure of the refrigerant, which means that the first temperature value is determined according to the first pressure value by referring to the table of temperature and pressure of the refrigerant.

The first temperature difference between the first temperature value and the target temperature value is calculated. In the refrigerating mode, the first temperature value corresponding to the first pressure value is the evaporation temperature, and a difference between the evaporation temperature and the target temperature value is calculated. In the heating mode, the first temperature value corresponding to the first pressure value is the condensation temperature, and a difference between the condensation temperature and the target temperature value is calculated.

Figure 5:
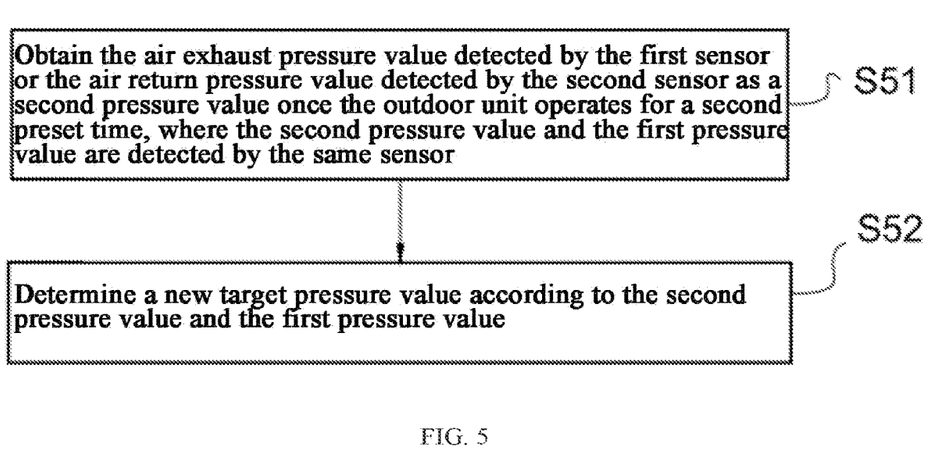
FIG. 5 is a flow chart of a control method for an air conditioner outdoor unit according to another embodiment of the present disclosure.

The step S34 of adjusting the frequency of the compressor according to the current frequency of the compressor and the first temperature difference, includes the following steps:
S41: determining a corresponding frequency difference according to the first temperature difference;
S42: determining a new frequency according to the current frequency and the frequency difference; and
S43: adjusting the frequency of the compressor to the new frequency.

The new frequency is determined by the following formula:

$$F=F0+\Delta F+C;$$

where F is the new frequency, F0 is the current frequency, $\Delta F$ is the frequency difference, and C is a preset frequency value.

The corresponding frequency difference is determined according to the first temperature difference by the following formula:

$$\Delta F=K\times\Delta T;$$

where $\Delta T$ is the first temperature difference, K represents a linear relationship between the first temperature difference and the frequency difference, and K is a preset value, in an embodiment, K may be 1 Hz/° C.

In an embodiment, a step of adjusting the operating parameters of the outdoor unit according to the target pressure value is further included between the step S21 and the step S22.

In some embodiments, the revolving speed value of the fan, the step number of the electronic expansion valve and the frequency value of the compressor are determined according to the target pressure value. A revolving speed the fan is adjusted to the revolving speed value of the fan, an opening degree of the electronic expansion valve is adjusted to the step number of the electronic expansion valve, and the frequency of the compressor is adjusted to the frequency value of the compressor.

In an embodiment, the outdoor unit executes the step S22 after operating for a first preset time according to the operating parameters. The first preset time may be set according to an actual requirement, and in an embodiment, the first preset time is set to be 60 seconds. That is, once the outdoor unit operates for the first preset time according to the operating parameters, it is considered that the frequency of the outdoor unit reaches the frequency value of the compressor, and after that the compressor is controlled.

In an embodiment, the control method further includes:
  correcting the target pressure value to determine a new target pressure value in a circle of a second preset time, and adjusting the frequency of the compressor according to the new target pressure value.

In some embodiments, the correcting the target pressure value includes the following steps.

In step S51, the air exhaust pressure value detected by the first sensor or the air return pressure value detected by the second sensor is obtained as a second pressure value once the outdoor unit operates for the second preset time, where the second pressure value and the first pressure value are detected by the same sensor.

In the refrigerating mode, the first pressure value is the air return pressure value detected by the second sensor, and then the second pressure value is the air exhaust pressure value obtained once the outdoor unit operates for the second preset time.

In the heating mode, the first pressure value is the air exhaust pressure value detected by the first sensor, and then the second pressure value is the air return pressure value obtained once the outdoor unit operates for the second preset time.

In step S52, the new target pressure value is determined according to the second pressure value and the first pressure value.

The new target pressure value is determined by changes of the second pressure value and the first pressure value in the second preset time.

Figure 6:
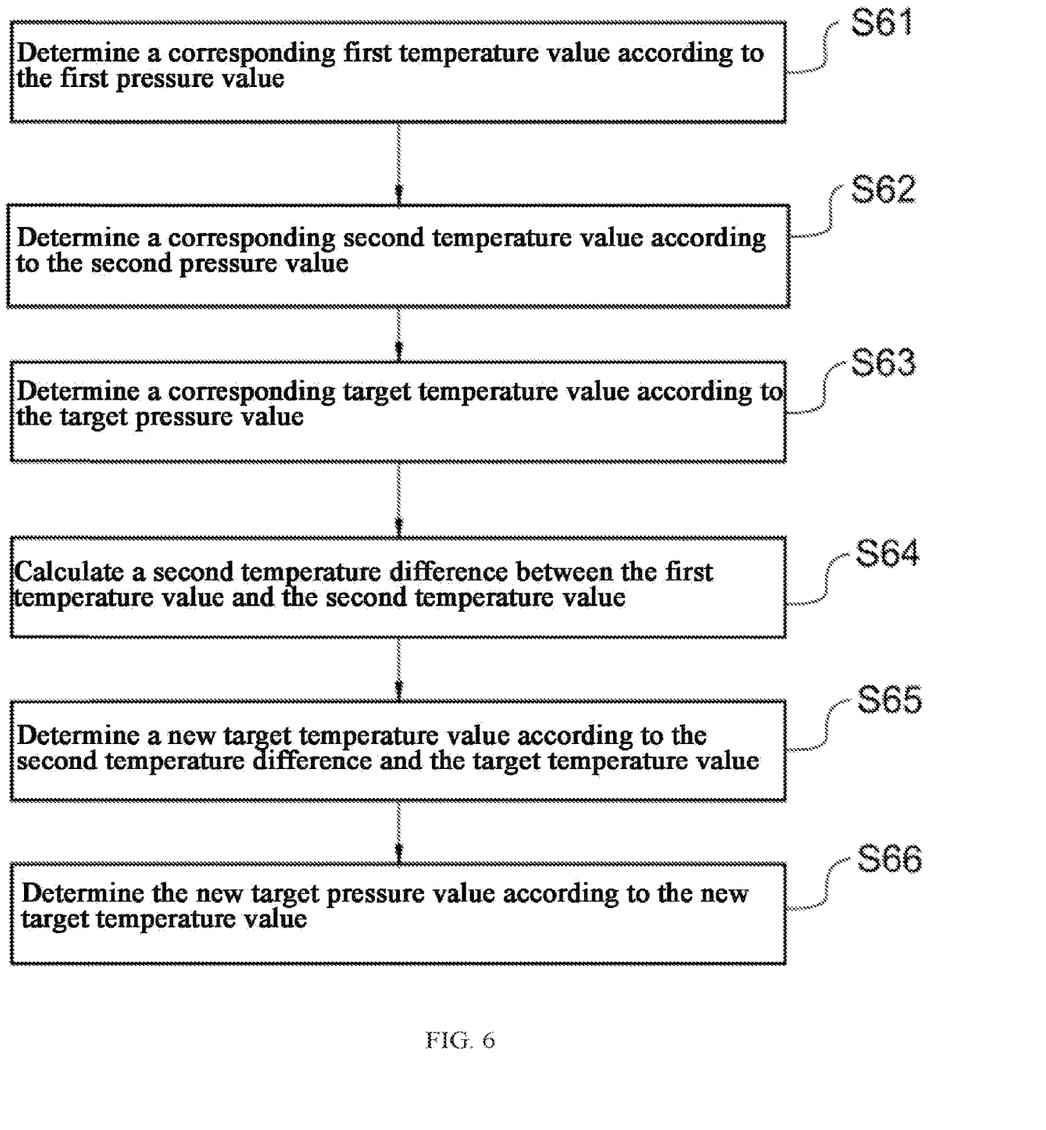
FIG. 6 is a flow chart of a control method for an air conditioner outdoor unit according to another embodiment of the present disclosure.

In an embodiment, the step S52 may further include the following steps:
  S61: determining a corresponding first temperature value according to the first pressure value;
  S62: determining a corresponding second temperature value according to the second pressure value;
  S63: determining a corresponding target temperature value according to the target pressure value;
  S64: calculating a second temperature difference between the first temperature value and the second temperature value;
  S65: determining a new target temperature value according to the second temperature difference and the target temperature value; and
  S66: determining the new target pressure value according to the new target temperature value.

In an embodiment, the step S65 of determining the new target temperature value according to the second temperature difference and the target temperature value, includes:
  when the second temperature difference is no greater than a first threshold, determining the new target temperature value being equal to the target temperature value plus a preset variable;
  when the second temperature difference is greater than the first threshold and no greater than a second threshold, determining the new target temperature value being equal to the target temperature value; and
  when the second temperature difference is greater than the second threshold, determining the new target temperature value being equal to the target temperature value minus the preset variable;
  where the second threshold is greater than the first threshold.

The first threshold, the second threshold and the preset variable may be set according to an actual situation. In an embodiment, a numerical value of the preset variable may be set to be 1° C. First and second thresholds may be set different in the refrigerating mode from the heating mode.

In an embodiment, in the refrigerating mode, the first threshold is set to be −5° C., and the second threshold is set to be −2° C.

When the second temperature difference is no greater than −5° C., it is indicated that the temperature is greatly reduced, and then the new target temperature value is increased by 1° C. When the second temperature difference is greater than −2° C., it is indicated that the temperature is slightly reduced, and then the new target temperature value is reduced by 1° C. When the second temperature difference is greater than −5° C. and no greater than −2° C., the target temperature value remains unchanged. A change of pressure value is converted into a change of temperature, an appropriate target temperature value can be updated according to the change of temperature, and an appropriate target pressure value is determined, and the frequency of the compressor can be adjusted according to an updated target pressure value, thus operation of the outdoor unit holds in a stable state.

In an embodiment, in the heating mode, the first threshold is set to be 2° C., and the second threshold is set to be 5° C.

When the second temperature difference is no greater than 2° C., it is indicated that the temperature is slightly increased, and then the new target temperature value is increased by 1° C. When the second temperature difference is greater than 5° C., it is indicated that the temperature is greatly increased, and then the new target temperature value is reduced by 1° C. When the second temperature difference is greater than 2° C. and no greater than 5° C., the target temperature value remains unchanged. A change of pressure value is converted into a change of temperature, an appropriate target temperature value can be updated according to the change of temperature, and an appropriate target pressure value is determined, and the frequency of the compressor can be adjusted according to an updated target pressure value, thus operation of the outdoor unit holds in a stable state.

In an embodiment, the second preset time may be set according to an actual situation. In an embodiment, the second preset time may be 1 hour.

In an embodiment, the target pressure value is corrected twice at most to determine the new target pressure value. After correcting the target pressure value twice, the operation of the outdoor unit tends to be stable, and the target pressure of the outdoor unit is no longer corrected to avoid excessive frequent corrections.

In an embodiment, the new target pressure value cannot exceed a pressure value range corresponding to 7° C. to 20° C.

In an embodiment, the determining the target pressure value, includes the following steps:

receiving a start-up signal sent by a signal box to control the outdoor unit to start; and determining the target pressure value.

The signal box sends the start-up signal or a shut-down signal to control the outdoor unit to start or shut down. After the outdoor unit is started, the target pressure value is determined. After the outdoor unit is shut down, the first pressure value at the moment of shut down is recorded. When the outdoor unit is in the refrigerating mode, the air suction pressure value detected by the first sensor is used as the first pressure value when the outdoor unit is shut down, and when the outdoor unit is in the heating mode, the air exhaust pressure value detected by the second sensor is recorded as the first pressure value when the outdoor unit is shut down.

In an embodiment, the signal box sends a start-up signal and a wind gear signal to an indoor unit while sending the start-up signal to the outdoor unit, and the indoor unit starts to operate according to a preset wind gear.

In an embodiment, the control method further includes: determining that a time interval between two times of start-up of the outdoor unit is no greater than a third preset time, and when a third temperature difference between a current outdoor temperature value and the first outdoor temperature value when the outdoor unit is started last time is no greater than a preset temperature, determining the target pressure value as the first pressure value obtained by the time of the outdoor unit being shut down, once the outdoor unit is re-started.

In the refrigerating mode, when the outdoor unit receives the shut-down signal, the air return pressure value obtained by the second sensor is recorded and the outdoor unit is shut down. When the time interval between two times of start-up of the outdoor unit is no greater than the third preset time, and the third temperature difference between the current outdoor temperature value and the first outdoor temperature value when the outdoor unit is started last time is no greater than the preset temperature, the recorded air return pressure value obtained by the second sensor is directly read as the target pressure value, and the outdoor unit directly operates according to the operating parameters before the last shut-down of the outdoor unit.

In the heating mode, when the outdoor unit receives the shut-down signal, the air exhaust pressure value obtained by the first sensor is recorded and the outdoor unit is shut down. When the time interval between two times of start-up of the outdoor unit is no greater than the third preset time, and the third temperature difference between the current outdoor temperature value and the first outdoor temperature value when the outdoor unit is started last time is no greater than the preset temperature, the recorded air exhaust pressure value obtained by the first sensor is directly read as the target pressure value, so that the outdoor unit directly operates according to the operating parameters before the last shut-down of the outdoor unit.

In an embodiment, the third preset time and the preset temperature may be appropriately selected according to an actual application situation, the third preset time may be 2 hours, and the preset temperature may be 3° C.

When a period from shutting down to re-starting of the outdoor unit does not exceed the third preset time, and a change of temperature of outdoor environment is no greater than the preset temperature, the first pressure value at the moment of shutting down of the outdoor unit is directly read as the target pressure value, which eliminates a process of determining the target pressure value, and saves system resources.

When the period from shutting down to re-starting of the outdoor unit exceeds the third preset time, or the change of temperature of outdoor environment is greater than the preset temperature, the target pressure value needs to be determined.

In the embodiment, the air exhaust pressure value or the air suction pressure value of the compressor is obtained as the first pressure value, the frequency of the compressor is adjusted according to the first pressure value and the target pressure value, and thus it is not necessary to obtain a signal from the indoor unit. The method may be applied to a situation where there is no communication between the indoor unit and the outdoor unit. The air conditioner can operate even if there is no communication between the indoor unit and the outdoor unit, and the indoor unit and the outdoor unit may be matched at will.

According to an architecture of the air conditioner mentioned in the embodiment above and various embodiments of the control method, the control method according to the embodiments of the present disclosure is explained with detailed description and explanation by examples below.

Figure 7:
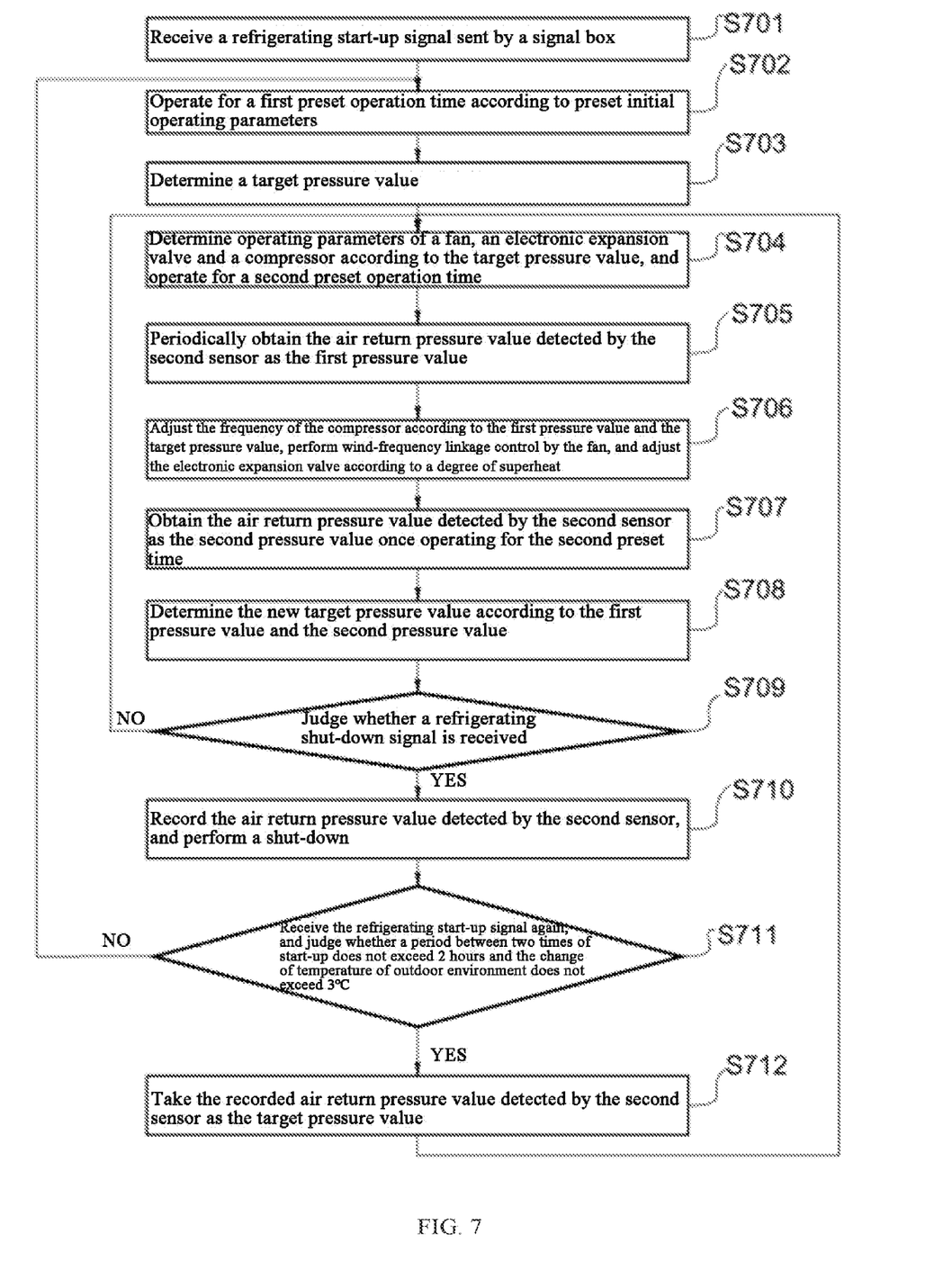
FIG. 7 is a flow chart of a control method for an air conditioner outdoor unit according to another embodiment of the present disclosure.

In an example, a flow chart of the control method in FIG. 7 shows that the air conditioner outdoor unit executes the following steps:

S701: receiving a refrigerating start-up signal sent by the signal box;

S702: operating for a first preset operation time according to preset initial operating parameters;

S703: determining the target pressure value;

S704: determining operating parameters of the fan, the electronic expansion valve and the compressor according to the target pressure value, and operating for a second preset operation time;

S705: periodically obtaining the air return pressure value detected by the second sensor as the first pressure value;

S706: adjusting the frequency of the compressor according to the first pressure value and the target pressure value, performing wind-frequency linkage control by the fan, and adjusting the electronic expansion valve according to a degree of superheat;

S707: obtaining the air return pressure value detected by the second sensor as the second pressure value after operating for the second preset time;

S708: determining the new target pressure value according to the first pressure value and the second pressure value;

S709: judging whether a refrigerating shut-down signal is received;

when the refrigerating shut-down signal is received, executing step S710; and when the refrigerating shut-down signal is not received, executing the step S704;

S710: recording the air return pressure value detected by the second sensor, and performing a shut-down;

S711: receiving the refrigerating start-up signal again, and judging whether a period between two times of start-up does not exceed 2 hours and the change of temperature of outdoor environment does not exceed 3° C.;

when the period between two times of start-up does not exceed 2 hours and the change of temperature of outdoor environment does not exceed 3° C., executing step S712; and when the period between two times of start-up exceeds 2 hours or the change of temperature of outdoor environment exceeds 3° C., executing the step S702; and S712: taking the recorded air return pressure value detected by the second sensor as the target pressure value, and executing the step S704.

Figure 8:
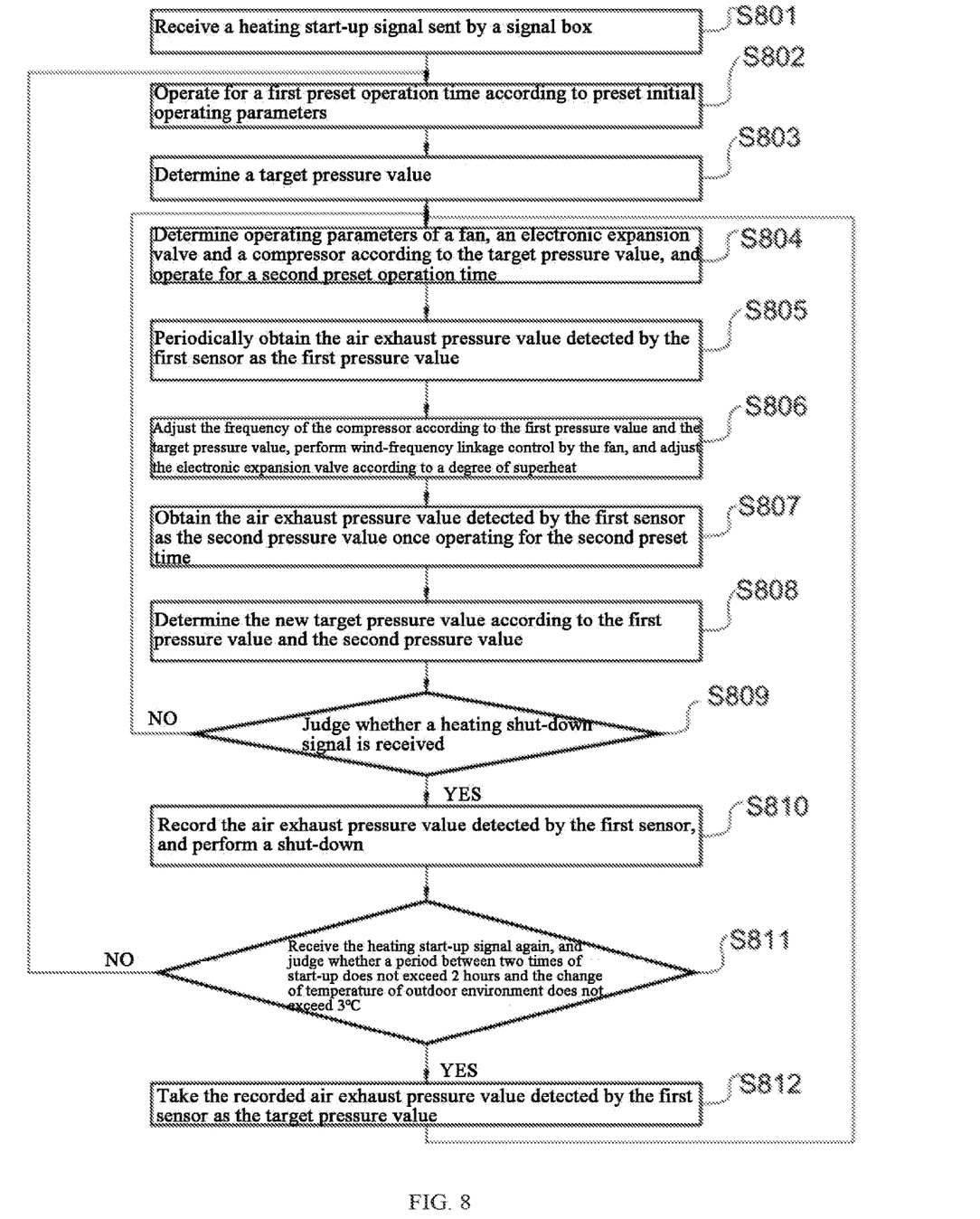
FIG. 8 is a flow chart of a control method for an air conditioner outdoor unit according to another embodiment of the present disclosure.

In an example, a flow chart of the control method in FIG. 8 shows that the air conditioner outdoor unit executes the following steps:

S801: receiving a heating start-up signal sent by the signal box;

S802: operating for a first preset operation time according to preset initial operating parameters;

S803: determining the target pressure value;

S804: determining operating parameters of the fan, the electronic expansion valve and the compressor according to the target pressure value, and operating for a second preset operation time;

S805: periodically obtaining the air exhaust pressure value detected by the first sensor as the first pressure value;

S806: adjusting the frequency of the compressor according to the first pressure value and the target pressure value, performing wind-frequency linkage control by the fan, and adjusting the electronic expansion valve according to a degree of superheat;

S807: obtaining the air exhaust pressure value detected by the first sensor as the second pressure value after operating for the second preset time;

S808: determining the new target pressure value according to the first pressure value and the second pressure value;

S809: judging whether a heating shut-down signal is received;

when the heating shut-down signal is received, executing step S810; and when the heating shut-down signal is not received, executing the step S804;

S810: recording the air exhaust pressure value detected by the first sensor, and performing a shut-down;

S811: receiving the heating start-up signal again, and judging whether a period between two times of start-up does not exceed 2 hours and the change of temperature of outdoor environment does not exceed 3° C.;

when the period between two times of start-up does not exceed 2 hours and the change of temperature of outdoor environment does not exceed 3° C., executing step S812; and when the period between two times of start-up exceeds 2 hours or the change of temperature of outdoor environment exceeds 3° C., executing the step S802; and S812: executing the step S804 by taking the recorded air exhaust pressure value detected by the first sensor as the target pressure value.

Based on the same concept, an embodiment of the present disclosure provides a device corresponding to the method.

Figure 9:
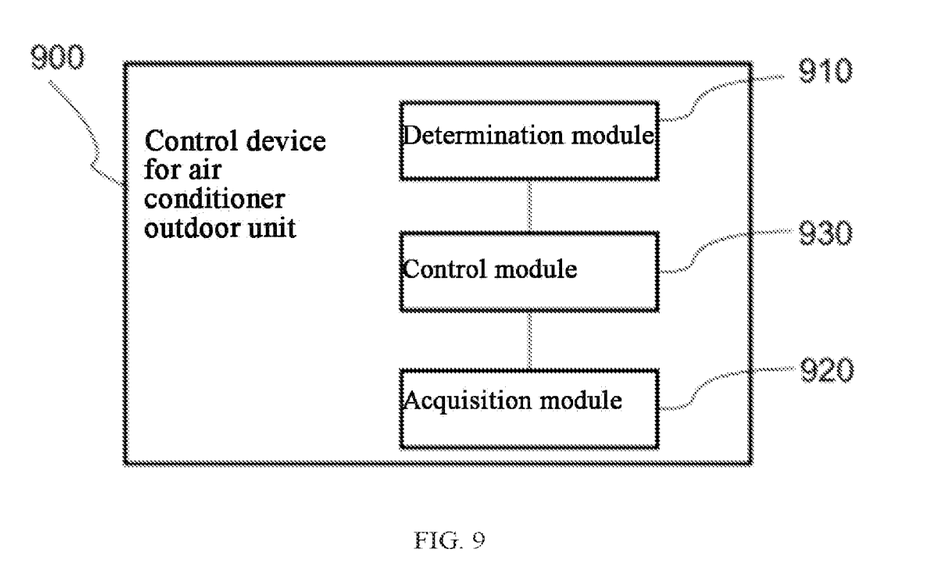
FIG. 9 is a schematic structural diagram of a control device for an air conditioner outdoor unit according to another embodiment of the present disclosure.

FIG. 9 shows a control device for an air conditioner outdoor unit according to an embodiment of the present disclosure. The outdoor unit includes a compressor, a first sensor configured to detect an air exhaust pressure of the compressor, and a second sensor configured to detect an air return pressure of the compressor. The control device 900 includes:

a determination module 910 configured for determining a target pressure value;

an acquisition module 920 configured for periodically obtaining an air exhaust pressure value detected by the first sensor or an air return pressure value detected by the second sensor as a first pressure value; and a control module 930 configured for adjusting a frequency of the compressor according to the first pressure value and the target pressure value.

It should be noted that, a process of determining the target pressure value by the determination module 910, a process of obtaining the first pressure value by the acquisition module 920, and a process of adjusting a frequency of the compressor by the control module 930 are explained in detail with reference to the above method embodiments, which will not be repeated herein. The determination module 910, the acquisition module 920 and the control module 930 can be implemented by a hardware processor.

An embodiment of the present disclosure further provides an air conditioner outdoor unit. The air conditioner outdoor unit includes a compressor, a first sensor configured to detect an air exhaust pressure of the compressor, and a second sensor configured to detect an air return pressure of the compressor, and further includes the control device 900 in the embodiment above.

In addition, another embodiment of the present disclosure further provides an air conditioner outdoor unit. The air conditioner outdoor unit includes a memory, a processor, and a computer program stored on the memory and executable by the processor.

In addition, an embodiment of the present disclosure further provides an air conditioner, including an indoor unit and an outdoor unit, and the outdoor unit is the air conditioner outdoor unit in the embodiment above.

In addition, another embodiment of the present disclosure further provides an air conditioner. The air conditioner includes a memory, a processor, and a computer program stored on the memory and executable by the processor.

The processor and the memory may be connected by a bus or in other arrangements.

The memory is used as a non-transitory computer-readable storage medium, and may be used for storing a non-transitory software program and a non-transitory computer-executable program. In addition, the memory may include a high-speed random access memory, and may further include a non-transitory memory, such as at least one disk memory device, flash memory device, or other non-transitory solid-state memory devices. In some embodiments, the memory may include a memory remotely arranged relative to the processor, and these remote memories may be connected to the processor through a network. Examples of the above network include but are not limited to the Internet, the Intranet, the local area network, the mobile communication network and a combination thereof.

It should be noted that the air conditioner in the embodiment may be the air conditioner in the embodiment shown in FIG. 1. The air conditioner in the embodiment and the air conditioner according to the embodiment shown in FIG. 1 belong to the same inventive concept, and the two air conditioners have the same principle and effect.

The non-transitory software program and instruction required to implement the control method in the embodiments above are stored in the memory, and the program and instruction are executed by the processor to perform the steps thereof.

The terminal embodiment described above is only illustrative, where the described units may or may not be in a physically separated arrangement, which means that the units may be located in one place or distributed in multiple network grids. Some or all of the modules may be selected according to actual needs to achieve the objects of the solutions in the embodiments.

In addition, another embodiment of the present disclosure further provides a non-transitory computer-readable storage medium. The non-transitory computer-readable storage medium stores a computer-executable instruction, and the computer-executable instruction is executed by one processor or controller. In an embodiment, when the computer-executable instruction is executed by one processor in the embodiment of the air conditioner above, the processor above may execute the steps in the embodiment above.

Those of ordinary skills in the art may understand that all or some of steps and systems in the method disclosed above may be implemented as software, firmware, hardware and appropriate combinations thereof. Some or all of the physical components may be implemented as software executed by a processor, such as a central processing unit, a digital signal processor or a microprocessor, or implemented as hardware, or implemented as an integrated circuit, such as an application-specific integrated circuit. Such software may be distributed on a computer-readable medium, and the computer-readable medium may include a computer storage medium (or a non-transitory medium) and a communication medium (or a transitory medium). As well known to those of ordinary skills in the art, the term 'computer storage medium' includes a volatile or nonvolatile, removable or non-removable medium implemented in any method or technology for storing information (such as a computer readable instruction, a data structure, a program module, or other data). The computer storage media include but are not limited to RAM, ROM, EEPROM, flash memory or other memory technologies, CD-ROM, digital versatile disk (DVD) or other optical disk storage, magnetic box, magnetic tape, magnetic disk storage or other magnetic storage devices, or any other media capable of being used to store desired information and accessed by a computer. Furthermore, it is well known to those of ordinary skills in the art that the communication media typically include a computer readable instruction, a data structure, a program module or other data in a modulated data signal such as a carrier wave or other transmission mechanism, and may include any information delivery medium.

The embodiments of the present disclosure have been described in detail above, but the present disclosure is not limited to the embodiments above. Those skilled in the art may further make various equivalent modifications or substitutions without departing from the scope of the present disclosure, and these equivalent modifications or substitutions are all included in the scope defined by the claims of the present disclosure.

The invention claimed is:

1. A control method for an air conditioner outdoor unit, wherein the air conditioner outdoor unit comprises a compressor, a first sensor configured to detect an air exhaust pressure value of the compressor, and a second sensor configured to detect an air return pressure value of the compressor, the control method comprising:
   determining a target pressure value;
   periodically obtaining the air exhaust pressure value detected by the first sensor or the air return pressure value detected by the second sensor as a first pressure value; and
   adjusting a frequency of the compressor according to the first pressure value and the target pressure value;
   wherein the determining the target pressure value comprises:
      obtaining a first outdoor temperature value;
      obtaining the air exhaust pressure value detected by the first sensor;
      obtaining the air return pressure value detected by the second sensor; and
      determining the target pressure value according to the first outdoor temperature value, the air exhaust pressure value and the air return pressure value.

2. The control method according to claim 1, wherein:
   when the air conditioner outdoor unit is in a refrigerating mode, the air return pressure value detected by the second sensor is periodically obtained as the first pressure value; and
   when the air conditioner outdoor unit is in a heating mode, the air exhaust pressure value detected by the first sensor is periodically obtained as the first pressure value.

3. The control method according to claim 1, wherein the determining the target pressure value according to the first outdoor temperature value, the air exhaust pressure value and the air return pressure value comprises:
   determining the target pressure value from a preset correspondence table according to the first outdoor temperature value, the air exhaust pressure value and the air return pressure value.

4. The control method according to claim 1, wherein the determining the target pressure value and the periodically obtaining the air exhaust pressure value detected by the first sensor or the air return pressure value detected by the second sensor as the first pressure value, comprise:
   determining the target pressure value;
   adjusting operating parameters of the air conditioner outdoor unit according to the target pressure value; and
   periodically obtaining the air exhaust pressure value detected by the first sensor or the air return pressure value detected by the second sensor as the first pressure value.

5. The control method according to claim 4, wherein the air conditioner outdoor unit further comprises a fan and an electronic expansion valve, and the adjusting the operating parameters of the air conditioner outdoor unit according to the target pressure value comprises:
   determining a revolving speed value of the fan, a step number of the electronic expansion valve and a frequency value of the compressor according to the target pressure value; and
   adjusting a revolving speed of the fan to the revolving speed value of the fan, adjusting an opening degree of the electronic expansion valve to the step number of the electronic expansion valve, and adjusting the frequency of the compressor to the frequency value of the compressor.

6. The control method according to claim 1, wherein the determining the target pressure value and the periodically obtaining the air exhaust pressure value detected by the first sensor or the air return pressure value detected by the second sensor as the first pressure value, comprise:
   determining the target pressure value;
   adjusting operating parameters of the air conditioner outdoor unit according to the target pressure value;
   operating the outdoor unit for a first preset time according to the operating parameters; and
   periodically obtaining the air exhaust pressure value detected by the first sensor or the air return pressure value detected by the second sensor as the first pressure value.

7. The control method according to claim 6, further comprising:
   obtaining the air exhaust pressure value detected by the first sensor or the air return pressure value detected by the second sensor as a second pressure value once the air conditioner outdoor unit operates for a second preset time; and determining a new target pressure value according to the second pressure value and the first pressure value, wherein the second pressure value and the first pressure value are detected by the same second sensor.

8. The control method according to claim 7, wherein the determining the new target pressure value according to the second pressure value and the first pressure value comprises:

determining a corresponding first temperature value according to the first pressure value;

determining a corresponding second temperature value according to the second pressure value;

determining a corresponding target temperature value according to the target pressure value;

calculating a second temperature difference between the first temperature value and the second temperature value;

determining a new target temperature value according to the second temperature difference and the target temperature value; and determining the new target pressure value according to the new target temperature value.

9. The control method according to claim 8, wherein the determining the new target temperature value according to the second temperature difference and the target temperature value comprises:

when the second temperature difference is no greater than a first threshold, determining the new target temperature value being equal to the target temperature value plus a preset variable;

when the second temperature difference is greater than the first threshold and no greater than a second threshold, determining the new target temperature value being equal to the target temperature value; and when the second temperature difference is greater than the second threshold, determining the new target temperature value being equal to the target temperature value minus the preset variable, wherein the second threshold is greater than the first threshold.

10. The control method according to claim 8, further comprising:

when the air conditioner outdoor unit is shut down and re-started, determining that a time interval between two times of start-up is no greater than a third preset time; and when a third temperature difference between a current outdoor temperature value and the first outdoor temperature value is no greater than a preset temperature, determining the target pressure value as the first pressure value obtained by the time of the air conditioner outdoor unit being shut down once the air conditioner outdoor unit is re-started.

11. The control method according to claim 1, wherein the adjusting the frequency of the compressor according to the first pressure value and the target pressure value comprises:

determining a corresponding first temperature value according to the first pressure value;

determining a corresponding target temperature value according to the target pressure value;

calculating a first temperature difference between the first temperature value and the target temperature value; and adjusting the frequency of the compressor according to a current frequency of the compressor and the first temperature difference.

12. The control method according to claim 11, wherein the adjusting the frequency of the compressor according to the current frequency of the compressor and the first temperature difference comprises:

determining a corresponding frequency difference according to the first temperature difference;

determining a new frequency according to the current frequency and the frequency difference; and adjusting the frequency of the compressor to the new frequency.

13. The control method according to claim 12, wherein the new frequency is determined by the following formula:

$$F=F0+\Delta F+C;$$

wherein F is the new frequency, F0 is the current frequency, $\Delta F$ is the frequency difference, and C is a preset frequency value.

14. The control method according to claim 13, wherein the determining the corresponding frequency difference according to the first temperature difference is implemented by the following formula:

$$\Delta F=K\times \Delta T;$$

wherein $\Delta T$ is the first temperature difference, K represents a linear relationship between the first temperature difference and the frequency difference, and K is a preset value.

15. The control method according to claim 1, wherein the determining the target pressure value comprises:

receiving a start-up signal sent by a signal box to control the air conditioner outdoor unit to start; and determining the target pressure value.

16. An air conditioner outdoor unit comprising a memory, a hardware processor, and a computer program stored on the memory and executable by the hardware processor, wherein the computer program, when executed by the hardware processor, causes the hardware processor to implement the control method according to claim 1.

17. A non-transitory computer-readable storage medium storing a computer-executable instruction, wherein the computer-executable instruction, when executed by a computer, causes the computer to implement the control method according to claim 1.

18. A control device for an air conditioner outdoor unit, wherein the air conditioner outdoor unit comprises a compressor, a first sensor configured to detect an air exhaust pressure value of the compressor, and a second sensor configured to detect an air return pressure value of the compressor; and the control device comprises a hardware processor being configured to:

determine a target pressure value;

periodically obtain the air exhaust pressure value detected by the first sensor or the air return pressure value detected by the second sensor as a first pressure value; and adjust a frequency of the compressor according to the first pressure value and the target pressure value, wherein the hardware processor being further configured to:

obtain a first outdoor temperature value;

obtain the air exhaust pressure value detected by the first sensor;

obtain the air return pressure value detected by the second sensor; and determine the target pressure value according to the first outdoor temperature value, the air exhaust pressure value and the air return pressure value.

19. An air conditioner outdoor unit comprising:
a compressor;
a first sensor configured to detect an air exhaust pressure of the compressor;
a second sensor configured to detect an air return pressure of the compressor; and
the control device according to claim 18.

* * * * *